(12) United States Patent
Bowe et al.

(10) Patent No.: US 7,887,886 B2
(45) Date of Patent: Feb. 15, 2011

(54) METHOD FOR TREATING CONCRETE

(75) Inventors: Michael Damian Bowe, Doylestown, PA (US); Robert Krasnansky, Le Rouret (FR); Bruno Pollet, Valbonne (FR); Odile Louise Quet, Mougins le Haut (FR)

(73) Assignee: Rohm and Haas Company, Philadelphia, PA (US)

( * ) Notice: Subject to any disclaimer, the term of this patent is extended or adjusted under 35 U.S.C. 154(b) by 506 days.

(21) Appl. No.: 11/999,422

(22) Filed: Dec. 5, 2007

(65) Prior Publication Data

US 2008/0152813 A1      Jun. 26, 2008

(30) Foreign Application Priority Data

Dec. 22, 2006   (EP) ................... 06292047

(51) Int. Cl.
*B05D 3/02* (2006.01)
*B05D 1/02* (2006.01)

(52) U.S. Cl. .................................................. 427/393.6
(58) Field of Classification Search ....................... None
See application file for complete search history.

(56) References Cited

U.S. PATENT DOCUMENTS

| | | | |
|---|---|---|---|
| 4,325,856 A | | 4/1982 | Ishikawa et al. |
| 4,654,397 A | | 3/1987 | Mueller-Mall et al. |
| 4,814,373 A | | 3/1989 | Frankel et al. |
| 5,512,619 A | | 4/1996 | DeWacker et al. |
| 5,718,943 A | * | 2/1998 | Hsu et al. .................... 427/136 |
| 7,105,593 B2 | * | 9/2006 | Solomon et al. ............. 524/457 |
| 2002/0022688 A1 | * | 2/2002 | Tysak et al. .................. 524/558 |
| 2002/0058739 A1 | * | 5/2002 | Lorah et al. .................. 524/445 |
| 2003/0236374 A1 | | 12/2003 | Bardman et al. |
| 2005/0222299 A1 | | 10/2005 | Garzon et al. |
| 2006/0178463 A1 | | 8/2006 | Sacks |

* cited by examiner

*Primary Examiner*—Erma Cameron
(74) *Attorney, Agent, or Firm*—Cantor Colburn LLP

(57) ABSTRACT

A method for treating at least partially uncured concrete is provided.

9 Claims, No Drawings

METHOD FOR TREATING CONCRETE

BACKGROUND

This application claims the benefit of priority under 35 U.S.C. §119(e) of European Patent Application No. 06292047.5 filed on Dec. 22, 2006, the disclosure of which is incorporated herein by reference.

This invention relates to a method for treating concrete, more specifically a method for treating at least partially uncured concrete to provide a water barrier and seal.

Concrete is commonly used in industry for constructing and repairing pavements, highways, buildings, dams, and other structures. Concretes are also known by various other names such as mortar, stucco, grout and the like. When a concrete slab is poured, there occurs a period of setting, which is the initial solidification. After setting, concrete cures over an extended period of time. Curing is the process through which the hydration reaction completes, excess water is lost and the concrete develops its strength. It is important to retain the water within the concrete during the curing process, particularly during the early stages of the curing process. In order for concrete to cure properly, sufficient water must be present in the concrete mix to hydrate the silicate and aluminate compounds that make up the cement. Either a deficiency or excess of water in the concrete during the curing process will result in the concrete not achieving its necessary or desired strength, and may even result in shrinkage, cracking, or the concrete having relatively low abrasion resistance. Formulations for making concrete should include sufficient water for hydration, and additional water to provide a consistency suitable for pouring the concrete. It is important that the rate at which this water is lost during the curing process be kept to a minimum.

Various materials, methods and procedures for curing concrete have been developed to maintain a satisfactory moisture content to enable the development of the desired concrete properties. One conventional method for providing water retention in the concrete is to place a sheeting, such as a polyethylene or polyvinyl chloride sheeting, fresh straw, hay, burlap or other protective sheeting or substance over freshly poured concrete and uncured concrete slabs. This method is disadvantageous in that the covering can be blown away, must be disposed of after use, cannot be walked on soon after the concrete has been poured, must usually be dampened for example by spraying or misting with water, which is labor intensive, among other things.

Another conventional method for retaining water in the curing concrete is to apply a membrane-forming sealant composition over the exposed surfaces of the fresh concrete to reduce the rate of water loss from the concrete by evaporation. Various membrane-forming compositions have been developed which are effective for maintaining a satisfactory moisture content in freshly poured concrete. Such compositions include refined linseed oil diluted in solvent, acrylic resins dissolved in solvent, and hydrocarbon resins or waxes dissolved in solvent. However, compositions containing solvents are undesirable, since their use results in the release of volatile organic compounds (VOC's) into the atmosphere, pollution and production of objectionable odors, environmental issues caused by spillage, runoff and overspray during application, and they are further undesirable due to their high flammability and their tendency to cause skin or respiratory irritation to humans exposed to the membrane-forming composition, among other things. Those compositions containing waxes further suffer from the disadvantages of poor film formation, and the requirement that they be removed from the cured concrete surface before any other material will adhere to the concrete. The wax removal usually requires the use of strenuous mechanical abrasion, such as for example sandblasting, and it adds to the cost and labor requirements associated with the construction process, and also causes delays in preparing and finishing the concrete structure which in turn delays the entire building process.

A different type of composition that is commonly used for concrete water retention is a coating containing hydrophobic polymers, which are typically formulated with a solvent, coalescent, or soap, among other things. The solvent in these coatings result in VOC's, which are undesirable for at least the reasons described herein above. Even where the hydrophobic polymers are used in the absence of a solvent, a coalescent is typically required to aid in film formation, since these polymers tend to be of a type that are non-film forming at room temperature. Additionally, in order to function correctly, these types of coatings must contain a high percentage of solids, which can result in the coatings being costly. Further, if they are not evenly applied, localized curing performance failures can occur.

It is therefore desirable to provide a concrete treating composition that can be applied shortly after the concrete is poured, where it would form a membrane on the concrete surface, thereby reducing construction delays and improving the strength of the concrete slab. This would enable treating of the concrete while the concrete is still "green", that is, while the concrete is in an uncured or partially uncured state. Additional benefits would be realized if the coating could be applied before the concrete sets, while it is still fluid. Further benefits would be realized if the coating were convenient to apply using conventional methods, solvent-free, not flammable, ecologically acceptable, relatively inexpensive, provided performance consistency, and did not need to be removed.

U.S. Pat. No. 5,512,619 discloses a method for curing concrete by applying to uncured concrete a curing composition containing an admixture of a hydrophobic acrylic or styrene polymer, a coalescent agent, and a polysaccharide, thereby forming a curing composition on the concrete substrate; allowing the concrete to cure; and removing the film from the concrete substrate.

United States Patent Application having publication number 2005/0222299 discloses a method of providing a coated substrate by (a) forming an aqueous coating composition having a pigment volume concentration of from 60 to 95, which composition contains a pigment and a aqueous emulsion copolymer having a particle size of from 50 to 350 nanometers, a glass transition temperature of from −20° C. to 60° C., and having as polymerized units at least one ethylenically unsaturated phosphate monomer; (b) applying the composition to a substrate, which may be a cured cementitious substrate, and drying or allowing the composition to dry.

The first aspect of the invention is a method for treating uncured concrete, comprising the steps of: (i) pouring concrete to form a first concrete layer, wherein said first concrete layer has an exposed surface; (ii) applying a treating composition onto the exposed surface of said concrete layer, wherein said treating composition comprises: (a) from 5 wt % to 70 wt % of a water borne polymeric binder wherein said binder comprises as copolymerized units from 0.2 wt % to 10 wt % of at least one of an ethylenically unsaturated phosphate monomer or an ethylenically unsaturated phosphonate monomer, and (b) a liquid selected from the group consisting of water and solvent, wherein said applying is performed before said concrete layer has fully cured.

This invention is a method for treating uncured concrete so as to reduce, by an unexpectedly high amount, moisture vapor transmission from it. By "uncured", we mean freshly poured and unset concrete, and 'green' (set but uncured or partially uncured) concrete. The method of Applicants' invention does not suffer from at least one of the disadvantages associated with conventional methods of retaining moisture in concrete, as described above.

By "layer" we mean a mass of formed concrete that is poured in place leaving at least part of it exposed. A layer could be a wall where concrete in poured into a form, leaving an exposed surface at the top of the form, and where further surfaces are exposed when the concrete is set but only partially cured (i.e., still uncured). A "layer" could comprise a floor, sidewalk, dam, concrete pillars, road, bridge, railing, roof, or portions of such things that are made from concrete.

One step in the method of the invention involves pouring concrete to form a first concrete layer. The poured concrete contains a mixture of cement, at least one aggregate, and water. It is preferred that the poured concrete contain a ratio of from 10 parts aggregate to 1 part cement, more preferably from 6 parts aggregate to 1 part cement, even more preferably from 3 parts aggregate to 1 part cement. Preferably, the water is used in the concrete mix in amounts of from 25 to 75 lbs of water per 100 lbs cement, more preferably from 30 to 60 lbs of water per 100 lbs cement, even more preferably from 30 to 50 lbs of water per 100 lbs cement. The cement may be any hydratable cement suitable for making concrete, preferably it is a Portland cement. Suitable aggregates include those typically used to make concrete, including for example, sand, gravel, crushed stone, small river stone, and the like. In one embodiment of the invention, the concrete mix may further contain at least one additive. Suitable additives include those that provide enhanced performance of the concrete, including but not limited to improved workability, consistency, density, strength, durability, and the like. Examples of suitable additives include, for example, coloring agents such as for example mineral pigment, air-entraining material, accelerator, water repellant, fiber, plasticizer, superplasticizer, materials that limit efflorescence, retarders, pozzolans such as for example fly ash, and the like. Prior to pouring, the concrete ingredients are blended using a mixer suitable for such purposes, such as for example, a pan-type mixer, spiral-blade mixer, paddle mixer, and the like. The surface of the concrete that remains exposed to the atmosphere after pouring forms the concrete layer exposed surface. Methods for pouring concrete are well known in the art. The concrete may be poured either outside in the field or in the interior of a building such as for example a factory.

Another step in the method of the invention involves applying a treating composition onto the exposed surface of the concrete layer. Unlike conventional compositions used for concrete water retention, the treating membrane of the invention does not require use of a solvent. The binder polymer can be more hypdrophilic than the conventional hydrophobic monomers used for concrete water retention. The treating composition may be applied at a solids percentage significantly less than that used for traditional hydrophobic polymers, which provides for more cost effective concrete water retention.

The treating composition contains a water-borne polymeric binder and either water, a solvent, or a combination thereof. In a preferred embodiment, the composition contains the binder and water. By "water-borne polymeric binder" is meant herein an aqueous, water-dispersed polymer that is substantially solvent-free. In a preferred embodiment, the treating composition contains the binder in an amount of from 5 wt % to 70 wt %, preferably from 10 wt % to 30 wt %, even more preferably from 15 wt % to 25 wt %, based on solids weight percent of the treating composition. The binder contains a copolymer which includes as copolymerized monomer units from 0.2 wt % to 10 wt %, preferably from 1 to 5 wt %, more preferably from 1 to 3 wt %, based on the weight of the binder, of an ethylenically unsaturated phosphate monomer or salts thereof, or an ethylenically unsaturated phosphonate monomer or salts thereof, or a combination thereof. Suitable binders include for example a polymeric binder having as copolymerized units 55 wt % butyl acrylate, 2.6 wt % phosphoethyl methacrylate, and 42.4 wt % methyl methacrylate, prepared according the to methods of the United States Patent Application having Publication Number 2005/0222299.

Ethylenically unsaturated phosphate monomers suitable for the invention include, for example, phosphoalkyl(meth) acrylates such as phosphoethyl(meth)acrylate, phosphopropyl(meth)acrylate, and phosphobutyl(meth)acrylate, phosphoalkyl crotonates, phosphoalkyl maleates, phosphoalkyl fumarates, phosphodialkyl(meth)acrylates, phosphodialkyl crotonates, vinyl phosphates, and (meth)allyl phosphate. Preferred are phosphoalkyl methacrylates. It is also contemplated that the copolymerized ethylenically unsaturated phosphate monomer may be formed after the polymerization of at least one ethylenically unsaturated nonionic monomer and a phosphate precursor monomer by effecting the reaction of the copolymerized phosphate precursor monomer so as to convert it to a copolymerized phosphate monomer. For example, a polymer containing, as a polymerized unit, hydroxyethyl methacrylate which may then be reacted, as is well known in the art, to form, for example, phosphoethyl methacrylate.

Ethylenically unsaturated phosphonate monomers suitable for the invention include, for example vinyl phosphonic acid and salts thereof, vinyl phosphinic acid and salts thereof, and the like.

In one embodiment of the invention, the binder copolymer may also include as copolymerized units at least one ethylenically unsaturated nonionic monomer. By "nonionic monomer" herein is meant that the copolymerized monomer residue does not bear an ionic charge between pH=1-14. Suitable ethylenically unsaturated nonionic monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate; (meth)acrylonitrile; (meth)acrylamide; amino-functional and ureido-functional monomers; monomers bearing acetoacetate-functional groups; styrene and substituted styrenes; butadiene; ethylene, propylene, α-olefins such as 1-decene; vinyl acetate, vinyl butyrate and other vinyl esters; and vinyl monomers such as vinyl chloride, vinylidene chloride.

In a different embodiment of the invention, the binder may contain from 0 to 5%, by weight based on the dry weight of the binder, copolymerized ethylenically unsaturated carboxylic acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, and maleic anhydride. Preferred is 0-2% copolymerized ethylenically unsaturated carboxylic acid monomer.

In yet another embodiment of the invention, the binder may contain from 0% to 5%, by weight based on the dry weight of the binder, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. Preferred is the use of no copolymerized multi-ethylenically unsaturated monomers.

The glass transition temperature ("Tg") of the binder copolymer may be from −40° C. to 60° C., preferably from −15° C. to 20° C., and more preferably from −10° C. to 10° C. Tgs used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(calc.)=w(M1)/Tg(M1)+w(M2)/Tg(M2), \text{ wherein}$$

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1 Tg(M2) is the glass transition temperature of the homopolymer of M2, all temperatures being in ° K.

The glass transition temperatures of homopolymers may be found, for example, in "Polymer Handbook", edited by J. Brandrup and E. H. Immergut, Interscience Publishers.

The polymerization techniques used to prepare the binder may be an emulsion polymerization process, or it may be made by an alternative process and then dispersed in water. In one embodiment of the invention, the binder copolymer may be prepared by an emulsion polymerization process, many of which are well known in the art. During the polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The emulsion polymerization reaction temperature is maintained at a temperature lower than 100° C. throughout the course of the reaction. Preferred is a reaction temperature between 10° C. and 95° C., more preferably between 20° C. and 90° C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadine-sulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. Chelating agents for the metals may optionally be used.

Chain transfer agents such as, for example, halogen compounds such as tetrabromomethane; allyl compounds; or mercaptans such as alkyl thioglycolates, alkyl mercaptoalkanoates, and $C_4$-$C_{22}$ linear or branched alkyl mercaptans may be used to lower the molecular weight of the emulsion polymer and/or to provide a different molecular weight distribution than would otherwise have been obtained with any free-radical-generating initiator(s). Chain transfer agent(s) may be added in one or more additions or continuously, linearly or not, over most or all of the entire reaction period or during limited portion(s) of the reaction period such as, for example, in the kettle charge and in the reduction of residual monomer stage. Chain transfer agents are typically used in the amount of 0 to 25 wt %, based on the total weight of monomer used to form the binder copolymer. A preferred level of chain transfer agent is from 0.01 to 0.5, more preferably from 0.02 to 0.4 and most preferably from 0.05 to 0.2 mole %, based on the total number of moles of monomer used to form the binder copolymer In another embodiment of the present invention the binder polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, for a multi-staged polymer particle the amount of phosphate or phospohonate monomer shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373. A preferred multistage emulsion polymer contains phosphate or phosphonate monomer in only one of the stages.

The average particle diameter of the binder copolymer particles may be from 30 to 1000 nanometers, preferably from 50 to 500 nanometers, more preferably from 100 to 300 nanometers, as measured by a BI-90 Particle Sizer.

In one embodiment the treating composition may be substantially free of water-soluble phosphorous acid compounds such as may be achieved by purification of the phosphate or phosphonate monomer, of the binder copolymer, or both; alternatively the binder copolymer may be prepared by a process at a pH of less than 2 as is disclosed in US 20030236374.

In one embodiment of the invention, the treating composition, in addition to the binder copolymer described herein, may also contain one or more additional polymers. In a preferred embodiment the additional polymer may be an emulsion polymer which does not contain a phosphate or phosphonate monomer as a copolymerized unit. The additional polymer may be present at a level of from 0 to 200%, by weight based on the weight of the phosphate or phosphonate containing binder copolymer.

In a different embodiment of the invention, the treating composition may also contain a defoamer. Suitable defoamers include, for example, Tego Foamex™ LA-E 497 (manufactured by Degussa Inc. located in Dusseldorf, Germany). When they are used, defoamers are preferably used in an amount of from 0.1% to 1% by weight of the treating composition.

In yet another embodiment of the invention, where additional performance is desired, the treating composition may also contain additional components, such as for example antimicrobial agents, additional water-borne polymers, water-resistant fillers such as for example those described in US 2006/0178463, plasticizers, defoamers. The use and amount of such additives are well known to those skilled in the art. Suitable plasticizers include, for example, benzoate plasticizers (such as Benzoflex™ 50, manufactured by Velsicol, located in Chattanooga, Tenn.), and dibutyl phthalate, and the like, and combinations thereof. When they are used, plasticizers are preferably used in an amount of from 1% to 15% by weight of the treating composition. Suitable bacteriocidal agents include any agent which will inhibit the growth of micro-organisms such as bacteria, mold and mildew and the like on the surface of the membrane, such as for example, those that can be purchased commercially under the tradenames Kathon from Rohm & Haas in Philadelphia, Pa.; Proxcel from ICI America, Wilmington, Del.; and Tektemer from Merck in Rahway, N.J. When additives are used, they are simply added to the treating composition with moderate agitation during formulation. These compositions can be stable for up to a year, or even longer depending on the amount of bacteriocidal agent added. When they are used, bacteriocidal agents are typically used in an amount of from 0.01% to 5% by weight of the treating composition.

The treating composition may be clear or pigmented. In one embodiment of the invention, it may be pigmented and formulated so that it functions as a coating or paint composition, which may be described in the art as a low gloss or flat coating, primer, textured coating, and the like. Such coating compositions may be prepared by techniques which are well known in the coatings art. First, optionally, at least one pigment may be well dispersed in an aqueous medium under high shear such as is afforded by a Cowles mixer or, in an alternative, at least one predispersed pigment may be used. Then the binder copolymer may be added under low shear stirring along with other coatings adjuvants as desired. Alternatively, the binder copolymer may be included in the optional pigment dispersion step. In this embodiment of the invention, the treating composition may contain conventional coatings adjuvants such as, for example, tackifiers, emulsifiers, coalescing agents such as for example, Texanol™ (Eastman Chemical Co.), cosolvents such as, for example, glycols and glycol ethers, butyl carbitol, Dowanol™ PPH (Dow Chemical Company, located in Midland, Mich.) and the like, buffers, neutralizers, thickeners or rheology modifiers, humectants, wetting agents, biocides, plasticizers, antifoaming agents, colorants, waxes, and anti-oxidants. In a preferred embodiment, the treating composition is free or substantially free of solvent. However, where the binder polymer has a high Tg, making film formation difficult, a solvent may be used in combination with the binder, with or without water. Where the binder is used with a solvent, the solvent is preferably used in an amount of less that 25 wt % based on the binder weight.

The treating composition has sufficient solids content to provide for film formation. The solids content of the treating composition may be from about 5% to about 70% by volume, preferably from 10% to 30%, more preferably from 15% to 25%. The viscosity of the treating composition may be from 0.05 to 10 Pa·s (50 cps to 10,000 cps), as measured using a Brookfield viscometer; the viscosities appropriate for different application methods vary considerably.

In construction projects where large volumes of concrete must be applied in multiple layers, it is desirable to provide water retention for the first-poured concrete layer soon after applying the first layer, so that subsequent layers of concrete can be quickly poured. This would not only reduce moisture transport from or through the concrete, but would also reduce the moisture-related delays between pouring of the first concrete layer and subsequent application of additional concrete layers, coatings, or flooring materials (e.g. carpet, vinyl or wood tiling) and the like. To enable this, Applicants' treating composition may be applied onto the concrete exposed surface before the concrete has fully cured. That is, it may be applied while the concrete is fresh and "green", as soon as it has achieved initial set, or even applied to unset, wet, freshly poured concrete.

The treating composition may be applied to the concrete by any suitable method, such as for example, brushing, rolling, squeegeeing, pouring, rolling, spraying methods such as, for example, air-atomized spray, air-assisted spray, airless spray, high volume low pressure spray, and air-assisted airless spray, and/or any other conventional methods for applying liquids to surfaces as are know in the art. In a preferred embodiment, the treating composition is sprayed onto the concrete surface. The spraying rate may vary depending upon the solids content of the treating composition. In a preferred embodiment, the spraying rate is from 50 to 500 g/m$^2$, preferably from 100 to 300 g/m$^2$. When the treating composition has dried, it forms an effective water vapor barrier and sealant.

After application, the treating composition may be dried or allowed to dry. Heat may be applied to dry the treating composition. The treating composition may be dried, or allowed to dry, at a temperature of from 1° C. to 95° C. When the treating composition sets and dries, it forms a protective membrane which significantly reduces water vapor transmission from the concrete surface. The treating composition dries on the concrete surface to form a membrane which retains the water within the concrete, providing for even, enhanced curing of the concrete.

In one embodiment of the invention, after the treating composition has dried to form a membrane and the first-poured concrete layer has set, another layer of concrete may be poured on top of the first-poured concrete layer. The first concrete layer does not necessarily have to set completely before application of the second layer. It is only necessary that the first concrete layer set enough that it has sufficient strength to withstand the weight of the second concrete layer. The membrane on the first layer ensures the water retention of that first layer for proper and uniform curing during and after pouring of the second concrete layer. The second concrete layer may also be coated with the treating composition, with or without subsequent pouring of additional concrete layers on top of the second concrete layer.

After it has been poured, the concrete layer is cured or allowed to cure. Unlike conventional coatings or sealants, there is no need to remove the treating composition prior to pouring of additional layers of concrete, or application of a coating or adhesive or other material to the concrete surface bearing the membrane formed by the treating composition.

EXAMPLES

The following examples are provided to illustrate the invention and the results obtained by the test procedures. It will be understood by those skilled in the art that the references to particular formulations are merely exemplary and that other formulations may be made without departing from the scope of the present invention.

Protection Coefficient Testing

A treating composition according to the invention, and two comparative compositions were made by diluting three different binders to 40% solids as follows. Lower solids versions were made by further diluting this with water.

| BINDER COPOLYMER (50% SOLIDS) | 80 g | polymer emulsion having copolymerized phosphate-containing monomer |
|---|---|---|
| Water | 20 g | dilution |
| Tego Foamex LA-E 497 | 0.2 g | anti-foam |
| Total weight | 100.2 | |
| PRIMAL ™ SF-016 (50% SOLIDS) | 80 g | polymer emulsion |
| Water | 20 g | dilution |
| Tego Foamex LA-E 497 | 0.2 g | anti-foam |
| Total weight | 100.2 | |

NOTE:
Primal ™ SF-016 (manufactured by Rohm and Haas Company, Philadelphia, PA), is an acrylic copolymer emulsion similar in composition to the inventive example, except that SF-016 contains no phosphate nor phosphonate monomers.

| PRIMAL ™ CS-3800 (45% solids) | 88.94 g | polymer emulsion |
|---|---|---|
| Water | 3.94 g | dilution |
| Dowanol ™ PPh | 6.41 g | coalescent |
| Tego Foamex ™ LA-E 497 | 0.07 g | anti foam |
| Aqueous ammonia (28% solids) | 0.64 g | pH adjuster |
| Total weight | 100 g | |

Note:
Primal ™ CS-3800 (manufactured by Rohm and Haas Company, Philadelphia, PA) is a hydrophobic emulsion polymer containing no phosphate or phosphonate monomers.

A base concrete was prepared which contained 1350 grams of standard normal sand (EN-1961), 450 grams of cement 32.5 MPa, and 180 grams of water which were mixed for 3 minute in a planetary mixer. Styrofoam molds having dimensions of 14 cm×16 cm×4 cm were filled with this fresh mortar. The wet mortar and molds were weighed. Typical target weight was 1950 grams of fresh concrete. The filled molds were then placed into a 40° C./40% relative humidity oven for 30 minutes. Any excess water float was then removed by absorbent paper and the filled molds were reweighed. The treating composition was then sprayed on top of the uncured concrete at a given spread rate. The comparative compositions were sprayed on separate samples in the same manner. The samples were reweighed and the initial overall weight of the samples determined by subtracting off the water added from the application of the curing membrane. The filled molds with curing membranes were then put into the 40° C./40% relative humidity oven for fixed periods of time, typically 24 hours. The samples were reweighed at the fixed times and protection coefficients were determined by the following equation:

$$C = \frac{Pt - Pp}{Pt} \times 100$$

Where: C=Protection coefficient given in %.

Pt=loss of water of the mortar alone in grams.

Pp=loss of water of specimen protected with curing membrane corrected with quantity of water in curing membrane.

TABLE 1

Protection Coefficients at Varying % Solids, at 200 g/m²

| | % Solids | | | | | water |
|---|---|---|---|---|---|---|
| | 40 | 25 | 17.5 | 10 | 5 | 0 |
| Eg. 1 | 62 | 43 | 28 | 15 | −7 | −20 |
| COMPARATIVE Eg. 2 (SF-016 - based) | 19 | 0 | −14 | −17 | −24 | −20 |
| COMPARATIVE Eg. 3 (CS-3800 - based) | 68 | 39 | 11 | −2 | −15 | −20 |

TABLE 2

Protection Coefficients at Varying Spread Rates at 25% solids.

| | Spread Rate | | | | |
|---|---|---|---|---|---|
| | 50 | 100 | 150 | 200 | 250 |
| Eg. 4 | 0 | 16 | 34 | 50 | 56 |
| COMPARATIVE Eg. 5 (SF-016 - based) | −16 | −12 | −14 | 5 | 9 |
| COMPARATIVE Eg 6 (CS-3800 - based) | −36 | −2 | 22 | 44 | 58 |

Adhesion Testing

Shear bond adhesion properties were evaluated with a Walter and Bai apparatus on 5 cm×5 cm×1 cm patches of commercial self-leveling mortar (1000 grams Euromix powder and 160 grams water) applied on the surface of test samples which had been cured for 7 days using the various curing membranes. The shear bond adhesion test quantitatively measures the force required to shear off a mortar patch that has been cured on a concrete base. Four 5 cm×5 cm×1 cm concrete patches were centrally cast and cured on each of the concrete blocks used earlier in the protection coefficient measurement. After a specific curing time the specimens were mounted on the test machine and a shearing load was applied to the patch at a rate of 100 N/s until failure occurred. Dry shear bond adhesion was measured after 7 days of cure at 23° C. and 50% Relative Humidity. Wet shear bond adhesion was measured after 7 days of cure at 23° C. and 50% Relative Humidity plus 7 days soaking in water at room temperature. The samples were measured wet immediately after removing from water. In such a test, shear bond adhesion of ≧1.0 MPa is considered adequate performance to pass the test. In all cases, both the comparative examples and the inventive examples passed the test when the curing membrane had been applied at 17.5% solids or greater, at a spread rate of 200 g/m².

What is claimed is:

1. A method for treating uncured concrete, comprising the steps of:
   i. pouring concrete to form a first concrete layer having an exposed surface;
   ii. applying a treating composition onto the exposed surface of said concrete layer,
      wherein said treating composition comprises:
         (a) from 5 wt % to 70 wt % of a water borne polymeric binder wherein said binder comprises as copolymerized units from 0.2 wt % to 10 wt % of at least one of an ethylenically unsaturated phosphate monomer or an ethylenically unsaturated phosphonate monomer, and
         (b) a liquid selected from the group consisting of water and solvent,
      wherein said applying is performed before said concrete layer has fully cured;
wherein said applying is performed by spraying at a spray rate of from 100 to 300 g/m$^2$.

2. The method according to claim 1, wherein said binder further includes as copolymerized units at least one ethylenically unsaturated nonionic monomer.

3. The method according to claim 1, wherein said binder further includes as copolymerized units from 0 to 5%, by weight based on the dry weight of the binder, of at least one ethylenically unsaturated carboxylic acid monomer.

4. The method according to claim 1, wherein said treating composition further comprises from 0 wt % to 2 wt % of a defoamer.

5. The method according to claim 1, wherein said method further includes the step of pouring at least one second layer of concrete onto the exposed surface of said first concrete layer,
   wherein said second concrete layer is poured after said treating composition has dried to form a membrane, and said first concrete layer has set.

6. The method according to claim 1, wherein said treating composition further comprises at least one additional binder.

7. The method according to claim 1, wherein said method further includes the step of drying, or causing to dry, said treating composition.

8. The method according to claim 1, wherein said method further includes the step of allowing said concrete layer to cure.

9. The method according to claim 1, wherein the amount of water borne polymeric binder is from 10 wt % to 30 wt %.

* * * * *